2 Sheets—Sheet 1.

W. HEATON.
PROCESS OF PREPARING WARPS FOR LOOMS.

No. 186,249. Patented Jan. 16, 1877.

WITNESSES.
F. B. Townsend.
R. D. O. Smith.

INVENTOR
William Heaton.
By Clayton Bro.
his Attorneys.

W. HEATON.
PROCESS OF PREPARING WARPS FOR LOOMS.
No. 186,249. Patented Jan. 16, 1877.
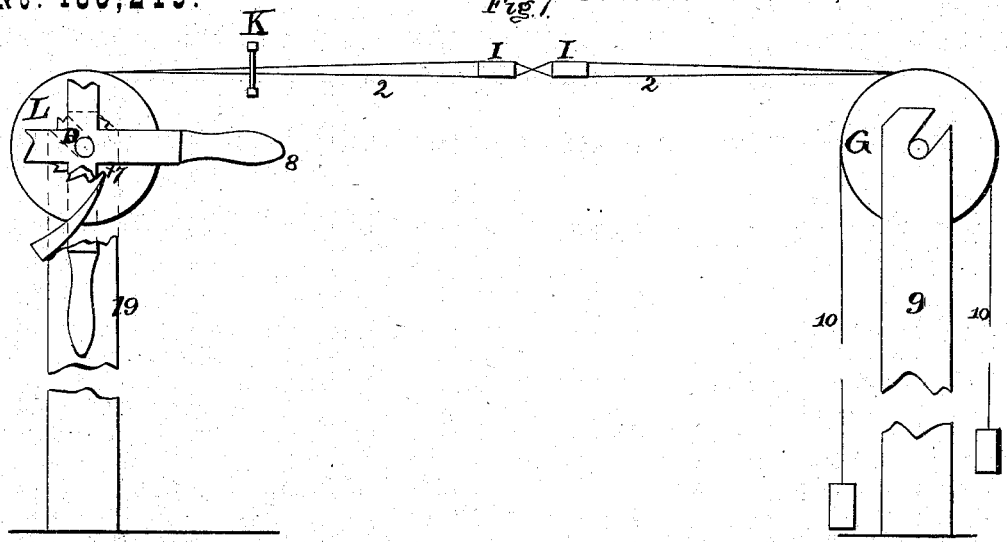
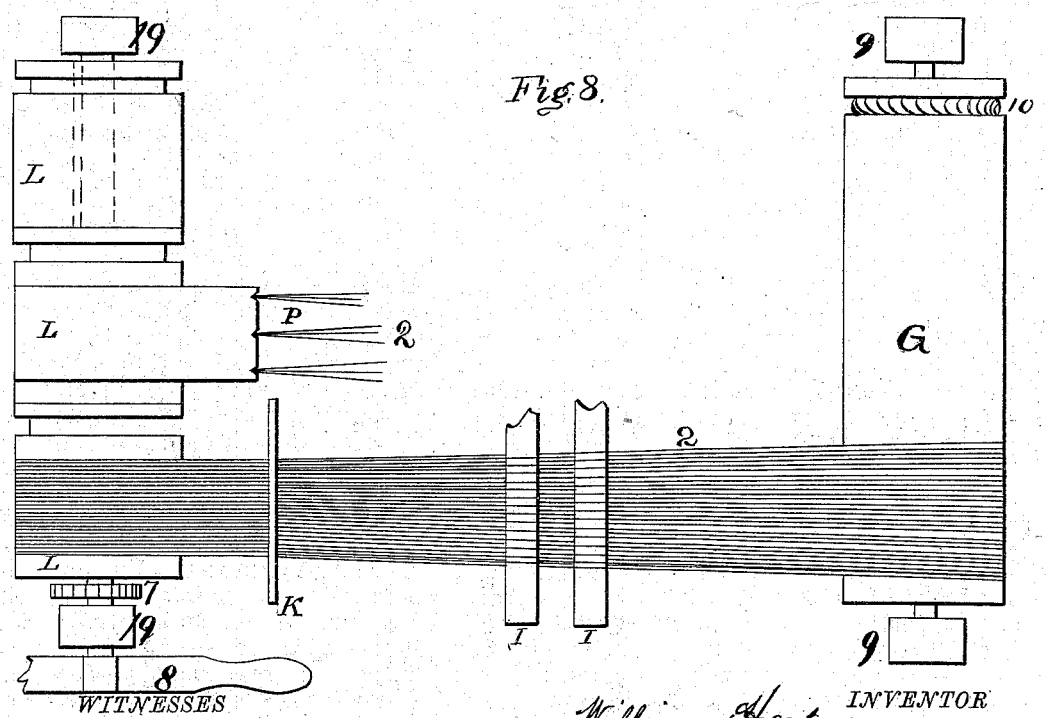
WITNESSES
F. B. Townsend.
R. D. Smith.
INVENTOR
William Heaton
By Clayton Bro.
his Attorney.

UNITED STATES PATENT OFFICE.

WILLIAM HEATON, OF PROVIDENCE, RHODE ISLAND, ASSIGNOR TO EDWARD P. CHAPIN AND FREDERIC CONDIT, OF SAME PLACE.

IMPROVEMENT IN PROCESSES OF PREPARING WARPS FOR LOOMS.

Specification forming part of Letters Patent No. 186,249, dated January 16, 1877; application filed August 25, 1875.

*To all whom it may concern:*

Be it known that I, WILLIAM HEATON, of Providence, Rhode Island, have invented certain improvements in the preparation, for the loom, of warps for ribbons, hat-bands, and other narrow fabrics made wholly or in part of silk. A patent for the same was granted me in Great Britain, dated May 14, 1873.

My invention consists of improvements in the process of preparation for the loom of warps for ribbons, hat-bands, and other narrow fabrics made wholly or in part of silk; and it consists in the process of thoroughly cleaning and picking the warps while they are being drawn through the reed or lease-rods.

In the ordinary mode of preparing warps for weaving narrow fabrics, such as ribbons, hat-bands, &c., the said warps are not thoroughly "picked" before being placed in the loom—that is to say, all lumps taken out, crossed threads straightened, or all soft, thick, imperfect, broken, and missing threads pieced or replaced, the warps being taken from the warping-mill, and in due time passed through a "skillet" or "batteau" having wide spaces, (from four to twelve in an inch,) in which a number of threads, collectively called "beers," "half-beers," or "porters," are put together through a space, and then wound upon a warp-beam or bobbin, the warps being generally worked one by one all through these processes. This mode of operation necessitates that the picking shall be effected either while the threads are being wound from the spools to and upon the warping-mill, while they are being "skilleted" upon the warp-beam, or else while the warps are being "woven down" in the loom, in which latter case the weaver, unless he has a "picker-up" behind the loom, must himself pick the warps.

Figure 1:
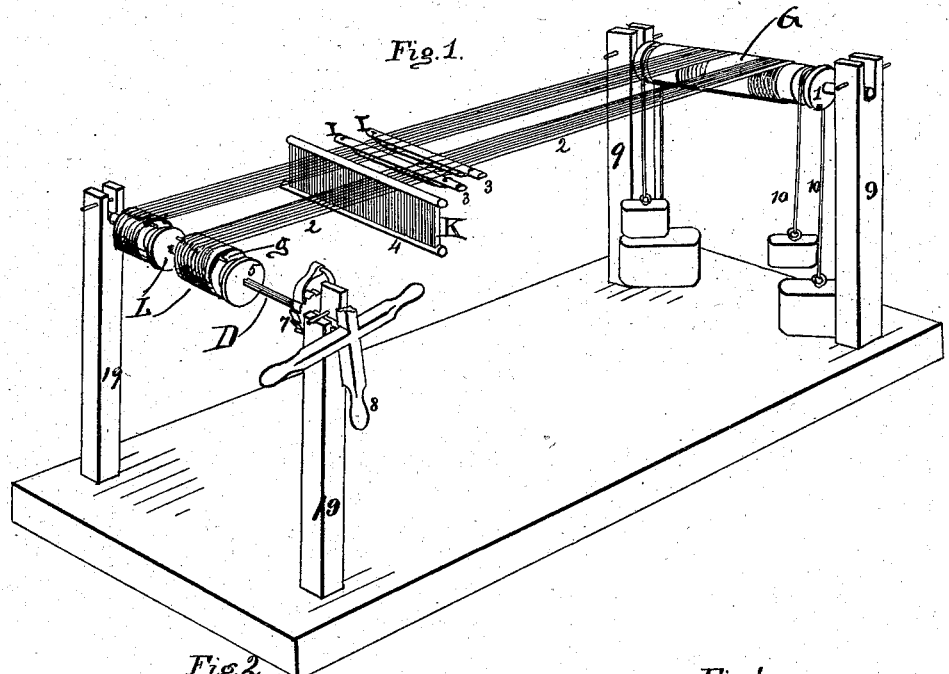
Figure 2:
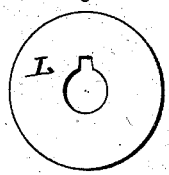
Figure 3:
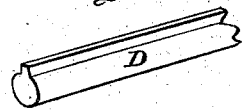
Figure 4:
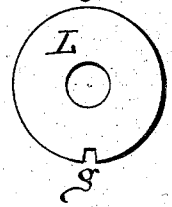
Figure 5:
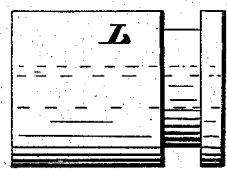
Figure 6:
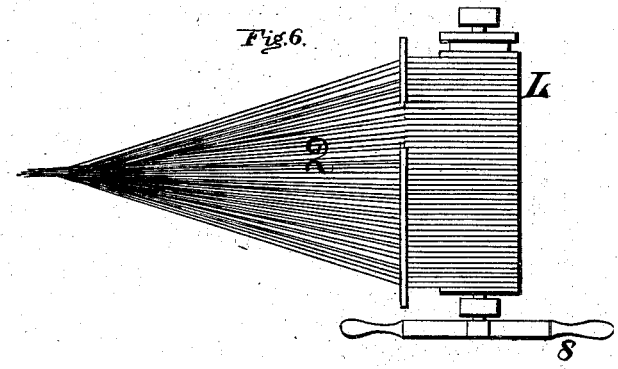

By my invention warps are taken from the warping-mill in twos, threes, or larger numbers, as desired, instead of singly, as heretofore, and wound upon a beam or straight roll, G, without flange or head, but grooved near one or both ends for the reception of weighted cords 10, the half-beers or porters—each consisting of from eight to thirty threads—being passed separately through the spaces of a skillet, (also called a "batteau" or "wraith,") so that the warps may be somewhat subdivided and spread upon the beam, as shown in Figure 1. As this is being done, pieces of paper or pasteboard are placed around the beam, between layers of the warp, as frequently as necessary to maintain a level surface. This operation being completed, the warps are reeded into a long reed, the warps being separated from each other, or into shorter reeds arranged in a line, one for each warp, one or more threads being passed into each dent or space of the reed, it being desirable to have as few threads as possible in each space, that the warps may be the more intimately subdivided. The beam G is then placed in a frame or on uprights 9, in a proper position to allow the warps to be rolled off, the revolutions of the beam being as much retarded as necessary by springs, weighted cords 10, or other suitable means.

A rod or shaft, D, preferably constructed of iron, with one or more feathers or raised portions running wholly or partly lengthwise, and either temporarily or permanently attached to the shaft, is placed in a frame, or on uprights 19, opposite and at a proper distance—usually about six feet—from the before-mentioned beam G, and on such shaft are placed as many warp-beams L as there are warps on the long beam G opposite.

The aggregate length of my series of short warp-beams L is limited by the arm's-length of the operator, usually not to exceed, say, thirty inches. This length of thirty inches may contain short warp-beams L, adapted, for example, to weave three ten-inch ribbons, or six five-inch ribbons, or twelve two-and-a-half-inch ribbons, or thirty one-inch ribbons. During the beaming-on process, this series of from two to thirty short warp-beams is entirely and conveniently under the glance and control of the operator, so that he can as thoroughly, and almost as easily, pick or clean the full thirty inches in width of threads as he could if he used but one short warp-beam. The shaft which carries the short warp-beams L usually moves at a certain rate, whether there be one or thirty beams on it, and there is ample opportunity for picking and cleaning.

These warp-beams are bored and grooved lengthwise, the bore and groove fitting the shaft D, the feathers or projections preventing the beams from turning on the shaft, while allowing them to slide thereon, so as to be placed in a proper position. The same results are obtained by having the separate beams L mounted in any other common and known manner.

The end of each warp 2 being made fast to the beam, two or more lease-rods or crosssticks, R, are inserted in the warps in such a manner that each single, double, or triple thread has its own proper place separate from the others, by carrying, for instance, the first thread over one of the rods and under the next, the second thread being carried under the first rod and over the second, as shown in the drawings, Figs. 7 and 8, and the warps are then drawn down or wound upon the warpbeams by the revolutions of the feathered shaft, which is turned by hand or by power, the shaft being prevented, by the action of the ratchet and catch 7, from yielding to the pull of the weighted beam opposite upon the removal of the power, it being desirable to keep the warps tightly stretched.

The warps are guided on the warp-beams by the reed or reeds K, and spread smoothly and evenly upon the beams, thus avoiding the liability to make striped or "portee-rowed" cloth, to which there is a frequent tendency under the old methods of skilleting onto the warp-beam.

I sometimes use an expanding and contracting reed. Sometimes I use the reed alone and no lease-rods, especially when but one or two single, double, or triple threads are placed in a space of the reed.

Great advantages are secured by using my improved warp-beams—which are straight rolls without flange or head, but grooved near one or both ends for the reception of weighted cords in the loom—and among these are the ease with which a number of warp-beams can have their warps put on at one and the same time, there being no heads or flanges for the threads to pile up against, making an uneven surface, and the facility with which the paper or pasteboard, as hereinafter described, can be used. When these are used, and sometimes when the ordinary beams are used, pieces or strips of paper or pasteboard, or other suitable material, are placed around the beams, between some or all the layers of warp while the winding on is being done, so that the warps shall maintain a smooth and level surface, free from ridges, preventing all possibility of making striped or portee-rowed work, by enabling all the threads to come off as nearly as possible uniformly tight.

While the warps are being wound upon the short warp-beams L they are picked—that is to say, all lumps and imperfections are removed, soft or split threads are removed and replaced, broken threads are mended, crossed ones are straightened, &c. In this mode of operation, the threads being kept individually, or in doubles or triplets, separate by the reed and the lease-rods, the facilities for picking rapidly and effectively are greater than by any of the methods hitherto employed; while, by thus cleaning, straightening, and rendering perfect and intact the different threads, it greatly promotes ease, simplicity, and rapidity of weaving when the warps are in the loom, besides making an improved quality of cloth.

When taken from the frame, the lease or cross of each warp is retained by the insertion of a lease-band.

The handles 8 are employed to revolve the short beams L; but a pulley may be used instead, if power is employed.

Having described my invention, what I claim as new is—

The process herein described of preparing the threads and the warp-beams for the loom, consisting of winding the warp from the warping-mill upon a long beam, and thence simultaneously upon two or more short beams, and picking or clearing the same in its passage, from the long beam to the interposed skillet or lease-rods.

WILLIAM HEATON.

Witnesses:
J. B. GOULD,
FREDERIC CONDIT.